(12) United States Patent
Wei

(10) Patent No.: US 11,819,156 B2
(45) Date of Patent: Nov. 21, 2023

(54) COFFEE MACHINE FILTER CARTRIDGES

(71) Applicant: Tianjin Yunda Industry and Trade Co., Ltd., Tianjin (CN)

(72) Inventor: Enyu Wei, Tianjin (CN)

(73) Assignee: TIANJIN YUNDA INDUSTRY AND TRADE CO., LTD, Tianjin (CN)

( * ) Notice: Subject to any disclaimer, the term of this patent is extended or adjusted under 35 U.S.C. 154(b) by 268 days.

(21) Appl. No.: 17/070,509

(22) Filed: Oct. 14, 2020

(65) Prior Publication Data
US 2022/0007882 A1   Jan. 13, 2022

(30) Foreign Application Priority Data

Jul. 13, 2020   (CN) .......................... 202021368006.1

(51) Int. Cl.
*C02F 1/00* (2023.01)
*C02F 5/10* (2023.01)
*A47J 31/60* (2006.01)

(52) U.S. Cl.
CPC ............. *A47J 31/605* (2013.01); *C02F 1/003* (2013.01); *C02F 5/10* (2013.01); *C02F 2201/005* (2013.01); *C02F 2201/006* (2013.01); *C02F 2307/12* (2013.01)

(58) Field of Classification Search
CPC ........... A47J 31/605; C02F 1/003; C02F 5/08; C02F 5/105; C02F 2307/10; C02F 2307/12; B01D 24/008; B01D 24/04; B01D 24/045; B01D 24/06; B01D 24/047; B01D 24/165; B01D 24/183
See application file for complete search history.

(56) References Cited

U.S. PATENT DOCUMENTS

| | | | |
|---|---|---|---|
| 2007/0289918 A1* | 12/2007 | Staiger .................... | C02F 1/003 210/440 |
| 2009/0242473 A1* | 10/2009 | Wallerstorfer ........ | A47J 31/605 210/232 |
| 2017/0050127 A1* | 2/2017 | Dani .................. | B01J 20/28052 |

* cited by examiner

*Primary Examiner* — Benjamin M Kurtz
(74) *Attorney, Agent, or Firm* — MEI & MARK LLP

(57) ABSTRACT

Exemplary embodiments of a filter cartridge for a coffee machine are disclosed. According to one exemplary embodiment, a coffee machine filter cartridge may include a filter body having a water inlet, a grate and a water outlet, and a lid held on the filter body. The water inlet is disposed around the water outlet. The water outlet connects to one end of the grate through a pipe. The other end of the grate is held on the inner wall of the filter body and comprises a cloth filter. A filter chamber between the pipe and the filter body has a descaling core. When filtering and descaling, the water flows sequentially through the water inlet, filter chamber, grate, cloth filter, pipe, and water outlet. The cartridge is structurally simple, convenient and accessible to users; preventing clogging of the internal parts of the coffee machine by slow dissolution of the descaling agent.

13 Claims, 8 Drawing Sheets

COFFEE MACHINE FILTER CARTRIDGES

CROSS-REFERENCE

The present disclosure claims priority to Chinese application No. 202021368006.1 filed Jul. 13, 2020, the entire subject matter and contents of which are incorporated herein by reference.

FIELD OF THE INVENTION

The present disclosure pertains to coffee machine components and more particular to a coffee machine filter cartridge.

DESCRIPTION OF RELATED ART

Coffee machines have been widely used in homes and offices, and for commercial use as automatic brewing equipment. However, during the use of existing coffee machines, calcium and magnesium ions in the water used in the brewing process will decompose at high temperatures used in coffee machines and react with carbon dioxide in the water, forming particles such as calcium carbonate and magnesium carbonate. With the continuous evaporation of water, the above-mentioned particles can saturate and form scales. The scales may cause blockage of the water path in coffee machines and affects the heating rate of the coffee machines. The long-term existence of scales may not only affect the taste of coffee but contaminate the inner parts of coffee machines.

A flake descaling agent is usually added into the coffee machine for descaling the inner part of the coffee machine. However, the flake descaling agent may be required to be dissolved because the descaling process may not be well-performed if it is not completely dissolved, and it may further deposit in the coffee machine and cause other problems.

SUMMARY

Therefore, exemplary embodiments of the present disclosure relate to a coffee machine filter cartridge that can, among other things, effectively solve the difficulties in removing scale when using coffee machines.

To attain the advantages and in accordance with the purpose of the present disclosure, as embodied and broadly described herein, one exemplary aspect of the present disclosure may provide a filter cartridge for a coffee machine comprising: a filter body comprising: an inner wall; a grate comprising a cloth filter, a first end, and a second end, the second end being connected to the inner wall; a water outlet connected to the first end of the grate through a pipe; and a water inlet disposed around the water outlet; a filter chamber formed between the pipe and the filter body and comprising a descaling core for removing scale; and a lid attached to the filter body, wherein during the filtering and descaling process, water flows sequentially through the water inlet, the filter chamber, the grate, the pipe, and the water outlet.

In one embodiment, the grate is funnel-shaped; the first end of the grate comprises a first boss providing an interference fit with the upper end of the pipe fastening the grate to the inner side of the filter body; and the second end of the grate comprises a bracket abutting a bulge on the inner wall of the filter body.

In another embodiment, the bracket is disposed annularly around the grate, and the bracket comprises a plurality of V-shaped grooves spaced evening around the bracket through which water may flow.

In yet another embodiment, the grate is further comprises a second boss to place the cloth filter; wherein the inner wall of the second boss is connected to the cloth filter.

In yet another embodiment, the supporting elements are disposed annularly along the inner wall of the grate and configured to prevent the cloth filter from falling and deforming.

In yet another embodiment, a first annular grid for water flow is disposed between the bracket and the second boss.

In yet another embodiment, the lower part of the first annular grid comprises a plurality of stiffeners for supporting the first annular grid.

In yet another embodiment, the upper side of the filter body comprises a convex stop, the lower side of the lid comprises a concave stop; and the convex stop matches the concave stop.

In yet another embodiment, the inner side of the filter body comprises a bracket plate comprising a water inlet, the water inlet is a second annular grid; and the water outlet is disposed in the center of the bracket plate.

In yet another embodiment, the water outlet is a hollow cylinder, and the pipe is sleeved on the hollow cylinder.

In yet another embodiment, the lower part of the bracket plate comprises an annular protrusion further comprising a sealing ring.

In yet another embodiment, the lid comprises a time recording disc to record the descaling time of the filter cartridge; the time recording disc comprising a plurality of time marks; and the time recording disc further comprises a pressure gland on the upper side of the time recording disc and wherein the pressure gland further comprises a notch for exposing the time mark.

In yet another embodiment, a convex ridge is disposed between each of the plurality of time marks, and each convex ridge is configured to be held by two ends of the notch.

In yet another embodiment, the lid further comprises a detachable sealing valve and the end caps comprise holes for placing the sealing valve.

The descaling core is a sodium citrate core.

A coffee machine comprising a heating device and a water tank, wherein the lower end of the water tank comprises a water tank base plate; and the heating device comprises a heater disposed on the water tank base plate; wherein the coffee machine further comprises a coffee machine filter cartridge disposed in the water tank; and the water tank base plate comprises holes for connecting the coffee machine filter cartridges and the heater.

In yet another embodiment, the heater comprises an L-shaped elbow, a heat pump, and a bulkhead connector; wherein one end of the L-shaped elbow is connected with the water outlet, and the other end of the L-shaped elbow is connected with one end of the heat pump; and the other end of the heat pump is connected with bulkhead connector through a pipe; and the heat pump comprises an impeller.

The coffee machine may further comprise a filter cartridge, the filter cartridge of the coffee machine or filter cartridge is provided in the water tank.

Additional objects and advantages of the present disclosure will be set forth in part in the description which follows, and in part will be obvious from the description, or may be learned by practice of the present disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure, as claimed.

BRIEF DESCRIPTION OF THE DRAWING FIGURES

The accompanying drawings, which are incorporated in and constitute a part of this specification, illustrate exemplary embodiments of the present disclosure and together with the description, serve to explain the principles of the present disclosure.

DETAILED DESCRIPTION

Reference will now be made in detail to the exemplary embodiments of the present disclosure, examples of which are illustrated in the accompanying drawings. Wherever possible, the same reference numbers will be used throughout the drawings to refer to the same or like parts.

When a component is indicated as being "installed on," "fixed in," "held on," or "provided on" another component, it can be directly on the other component or there may be an intervening part at the same time. When a component is indicated as being "connected" or "connected to" another component, it may be directly connected to or connected to another component at the same time.

During the course of the description, the terms left, right, up, and down in the embodiment of the present disclosure only refer to relative concepts or the normal use state of the products, and should not be considered restrictive.

One exemplary embodiment of the present disclosure may provide a coffee machine filter cartridge that may function to remove the scale from the water path of a coffee machine. Simultaneously, the water filtration process is required during the removing of the scale in order to prevent the impurities in water which caused the blockage of the water path in the coffee machine. In an embodiment of the present disclosure, a coffee machine filter cartridge is provided with a detachable inner part. Placing the coffee machine filter cartridge in a coffee machine achieves the result of removing the scale from the water path of the coffee machine.

Figure 1:
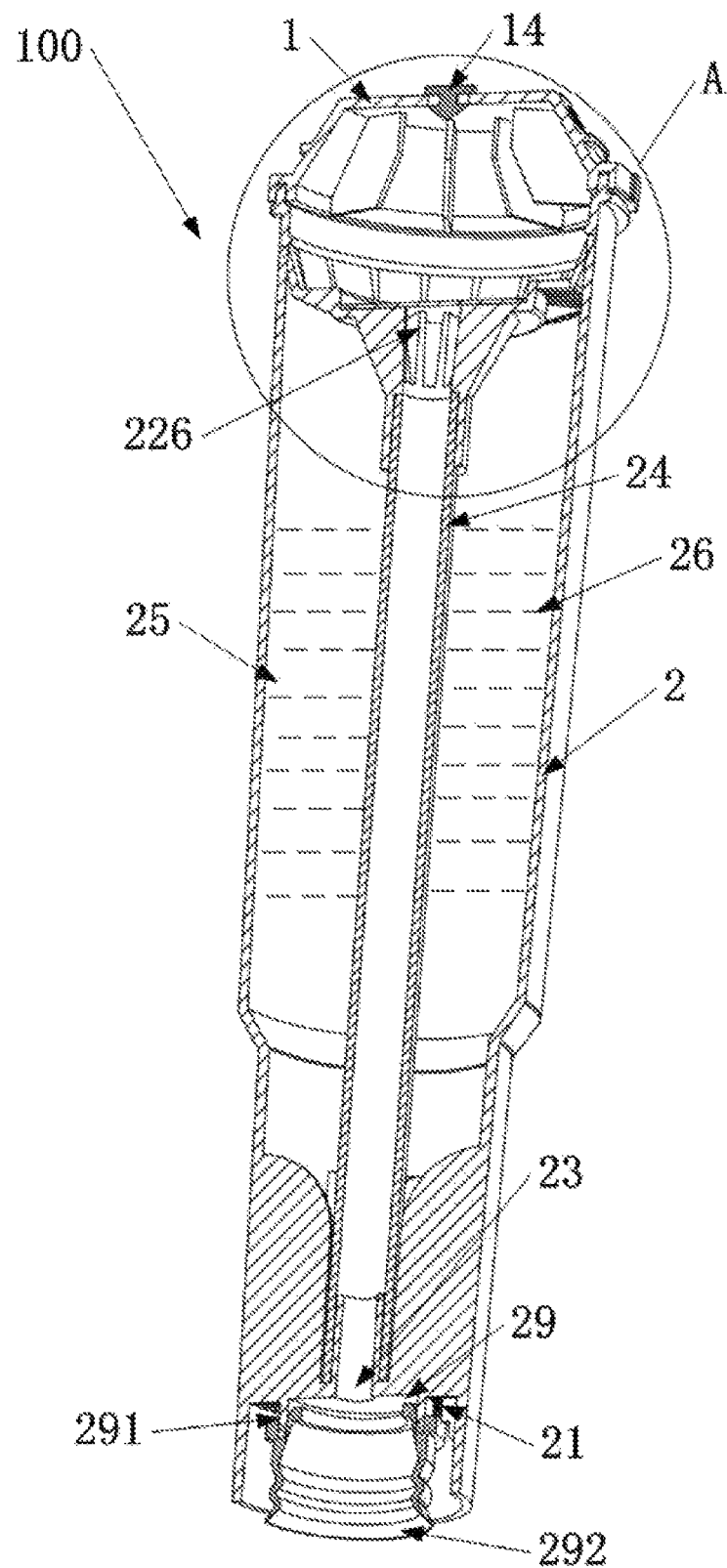
FIG. 1 is a cross sectional view of a coffee machine filter cartridge in accordance with the teachings of the present disclosure.
Figure 2:
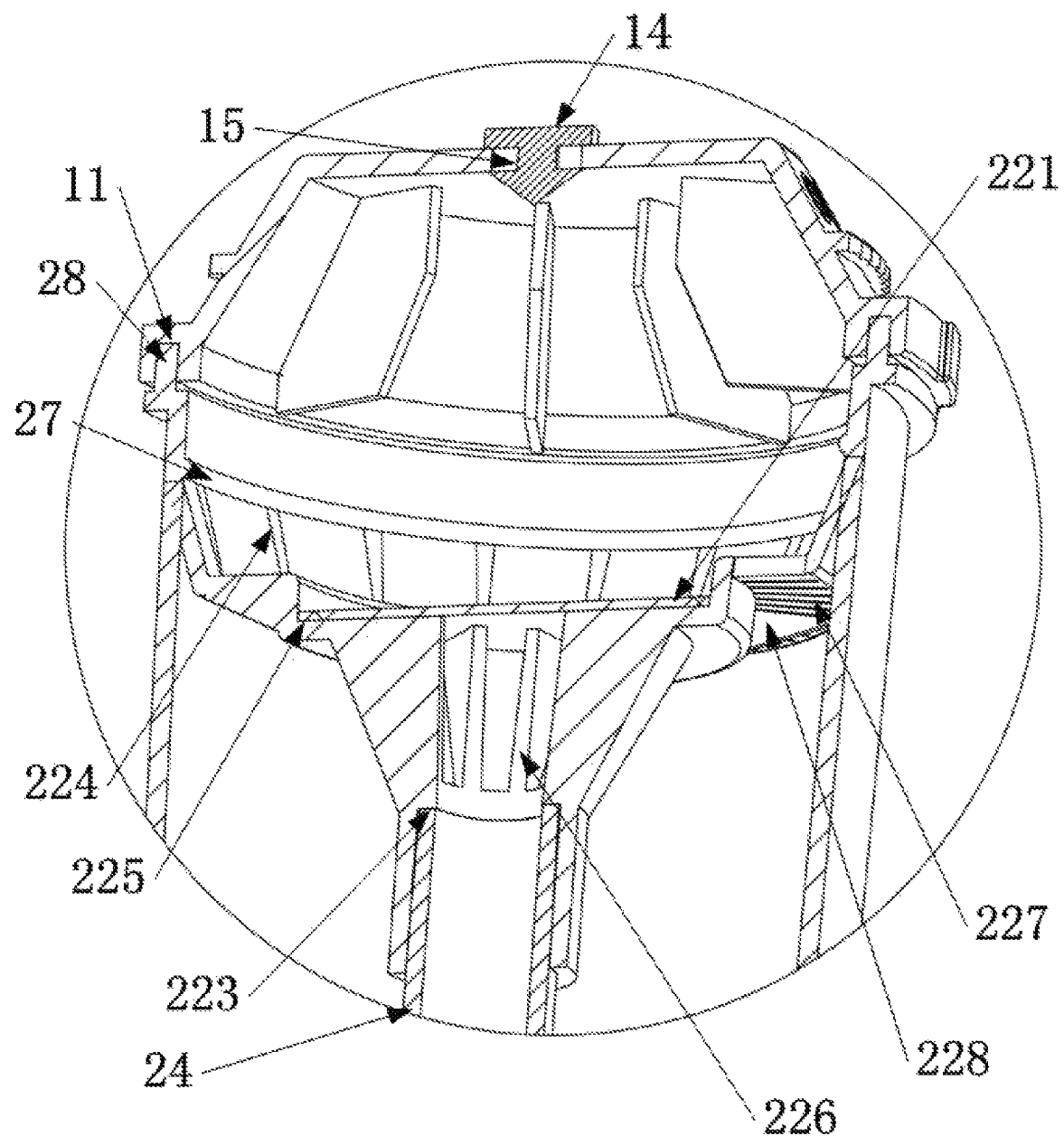
FIG. 2 is a partial enlarged view of part A in FIG. 1.
Figure 3:
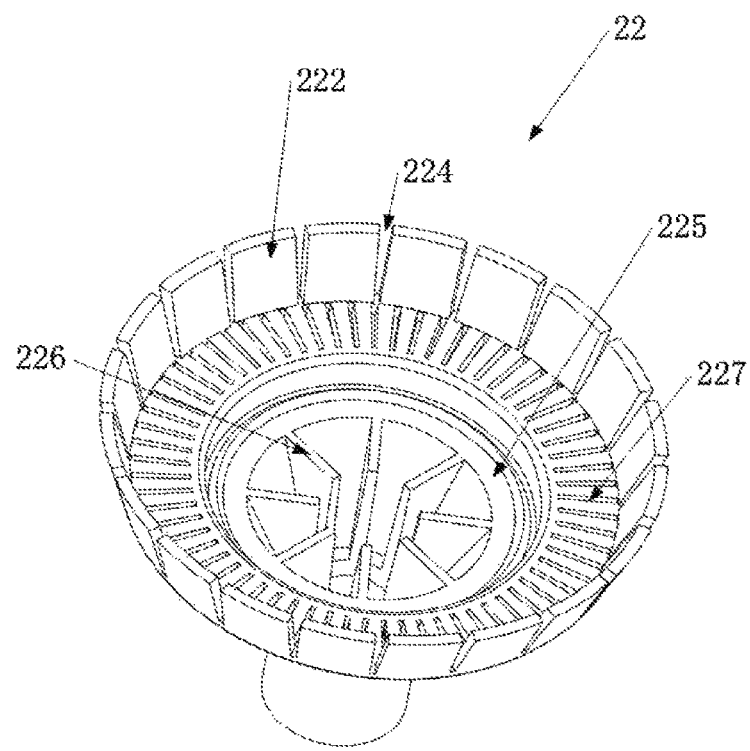
FIG. 3 is a schematic diagram of the grate in the filter cartridge of the coffee machine in accordance with the teachings of the present disclosure.

As shown in FIG. 1, FIG. 2, FIG. 3, the present disclosure provides a coffee machine filter cartridge 100, comprising a lid 1 and a filter body 2. The lid 1 is held on the filter body 2. The filter body 2 is provided with a water inlet 21, a grate 22, and a water outlet 23. The water outlet 23 is connected to one end of the grate 22 through a pipe 24. The other end of the grate 22 is held on the inner wall of the filter body 2. The grate 22 is provided with a cloth filter 221. A filter chamber 25 is formed between the pipe 24 and the filter body 2. The mentioned-filter chamber 25 is provided with a descaling core 26 for removing scale.

In preferred embodiments, the water inlet 21 and the water outlet 23 are both located at the bottom of the filter body 2, and the grate 22 is located on the upper part of the filter body 2. During the filtering and descaling process, the water flows sequentially through water inlet 21, filter chamber 25, grate 22, cloth filter 221, pipe 24, and water outlet 23. When water flows into the filter chamber 25, the descaling core 26 is partially dissolved, and the water grate 22, cloth filter 221, pipe 24, and water outlet 23 will flow out in order to filter the scale by the water flow and descaling the water path of coffee machine. The descaling core 26 can adopt a same chamber-shaped as sodium citrate core.

Specifically, the water inlet 21, the water outlet 23, and the grate 22 are all installed on the inner side of the filter body 2. The water inlet 21 and the water outlet 23 are located at the same level, and there are a plurality of water inlets 21, and all surrounded the outer side of the water outlet 23.

The upper end of the pipe 24 is connected to the lower end of the grate 22 (namely one end of the grate 22), the lower end of the pipe 24 is connected to the water outlet 23. The upper end of the grate 22 (namely the other end of the grate 22) is held on the inner wall of the filter body 2, and the grate 22 is fixed in the filter body 2 through the filter body 2 and the pipe 24 in order to prevent the grate 22 from moving during the filtration and descaling process of the coffee machine, which affects the result of filtration and descaling.

The lid 1 is located in the center of the grate 22, and the water sequentially passes through water inlet 21, filter chamber 25, grate 22, cloth filter 221, and water outlet 23 to ensure the sodium citrate core in the filter chamber 25 is fully dissolved and well-react with the scale for removing the scale from the water path of the coffee machine.

The sodium citrate core can use the tubular sodium citrate crystal. In order to increase the speed of dissolution, the tubular crystal is provided with honeycomb-shaped holes to make it easier to dissolve. The sodium citrate core can further be directly filled with sodium citrate particles or cubes of sodium citrate in the filter chamber 25. The present disclosure does not limit the structure of sodium citrate.

The present disclosure utilizes the water-soluble characteristic of sodium citrate. When the water flows, the sodium citrate will be fully dissolved in the water, and the sodium citrate will react with the scale in the water path of the coffee machine. Simultaneously, the impurities generated may be removed. Sodium citrate scale remover is a current technology, and will not be detailed here. The present disclosure can use other food-grade descaling filters.

The grate 22 may be formed in a funnel-shape. The other end (namely the upper end) of the grate 22 is provided with a bracket 222, and the bracket 222 abuts against a bulge 27 of the inner wall of the filter body 2. One end of the grate 22 is provided with first boss 223. The first boss 223 is in interference fit with the upper end of the pipe 24, whereby the grate 22 is fastened to the inner side of the filter body 2.

In an optional embodiment, the bracket 222 is inclined to form a circle, and the upper ends of the bracket 222 expands outward. The lower end of the bulge 27 abuts against the top end of the bracket 222, and it limits the upper end of the grate 22. The lower end of the grate 22 is supported by the upper end of the pipe 24 through the first boss 223. The pipe 24 acts as limiter to the bottom end of the grate 22, whereby grate 22 is fastened in the filter body 2.

In preferred embodiments, the bracket 222 is provided annularly around the center of the water grate 22, and the water flows through a plurality of V-shaped grooves 224 spaced on the bracket 222. The bracket 222 is provided annularly to render the upper end of the grate 22 forced uniformly for preventing the tilting of the grate 22 due to the impact caused by water flow. Due to the existence of the V-shaped grooves 224, the water flow entering into the grate 22 increased. It speeds up the water flow through the filter chamber 25, which causes the sodium citrate in the sodium citrate core to dissolve faster and achieve a better result of dissolution.

As shown in FIGS. 1 to 3, the grate 22 is further provided with a second boss 225 to place the cloth filter 221, and the inner wall of the second boss 225 is welded to the cloth filter 221. The grate 22 is provided with the supporting elements 226 for preventing the cloth filter 221 from falling and deformation. The supporting elements 226 is provided annularly along the inner wall of the grate 22. The first annular grid 227 for the water flow is provided between the bracket 222 and the second boss 225.

The arrangement of the second boss 225, on the one hand, can be used to place the cloth filter 221. On the other hand, there is a height difference between the cloth filter 221 and the V-shaped grooves 224 through the water flow and the first annular grid 227, thereby causing the water to flow properly and providing better filtration. The second boss 225 is provided with a welding wire for welding with the cloth filter 221. The cloth filter 221 is fixed by some welding methods such as ultrasonic, hot melt, etc., in order to prevent the movement of the cloth filter 221 caused by the impact of water flow and affect the filtration of the cloth filter 221.

Simultaneously, the middle part of the cloth filter 221 is supported by supporting elements 226 to avoid the deformation and falling of the cloth filter 221 that caused by water impact. The supporting elements 226 are provided annularly around the center of the water grate 22, which supports the filter cloth 221 without affecting the water flow. In addition, the existence of the first annular grid 227 not only restricts the direction of the water flow so that it flows properly, but further prevents the impurities from entering and blocking grate 22, which beneficially affects the speed of water flow.

A plurality of stiffeners 228 for supporting the first annular grid 227 are provided at the lower part of the first annular grid 227. The stiffeners 228 are connected to the bottom of the first annular grid 227 and the outer side wall of the grate 22. Ideally, the number of the stiffeners 228 in the present disclosure is 5 in total. The stiffeners 228 are provided to increase the strength and load capacity of the first annular grid 227 to prevent the grate 22 from being deformed, thereby prolonging the service life of the grate 22.

The upper side of the filter body 2 is provided with a convex stop 28, and the lower side of the lid 1 is provided with a concave stop 11 that matches with the convex stop 28. The convex stop 28 is matched with the concave stop 11 through ultrasonic welding to seal both the lid 1 and the filter body 2 to prevent affecting the speed of water flow and the dissolution sodium citrate due to the incomplete seal of the lid 1 and the filter body 2.

The lower part of the filter body 2 is provided with a bracket plate 29. The water inlet 21 is provided on the bracket plate 29, and the water inlet 21 is a second annular grid. The water outlet 23 is provided at the center of the bracket plate 29. The water outlet 23 is a hollow cylinder provided on the bracket plate 29, and the pipe 24 is sleeved on the hollow cylinder. An annular protrusion 291 is provided at the lower part of the bracket plate 29, and a sealing ring 292 is provided on the annular protrusion 291. The bracket plate 29 is located at the lower part of the inner side of the filter body 2. The hollow cylinder is located at the upper end of the bracket plate 29. The lower end of the pipe 24 is sleeved on the outer side of the hollow cylinder, and the outer wall of the hollow cylinder and the inner wall of the pipe 24 are contacted closely. The bottom of the pipe 24 is contacted with the bracket plate 29, and the bracket plate 29 is connected to water path of the coffee machine through the lower end of the annular protrusion 291 that matched with the sealing ring 292.

Figure 4:
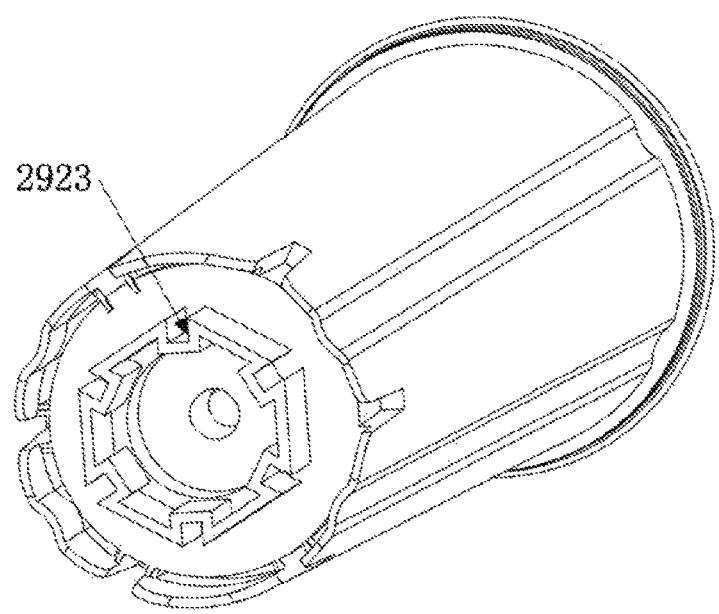
FIG. 4 is a schematic diagram of one sealing ring in accordance with the teachings of the present disclosure.
Figure 5:
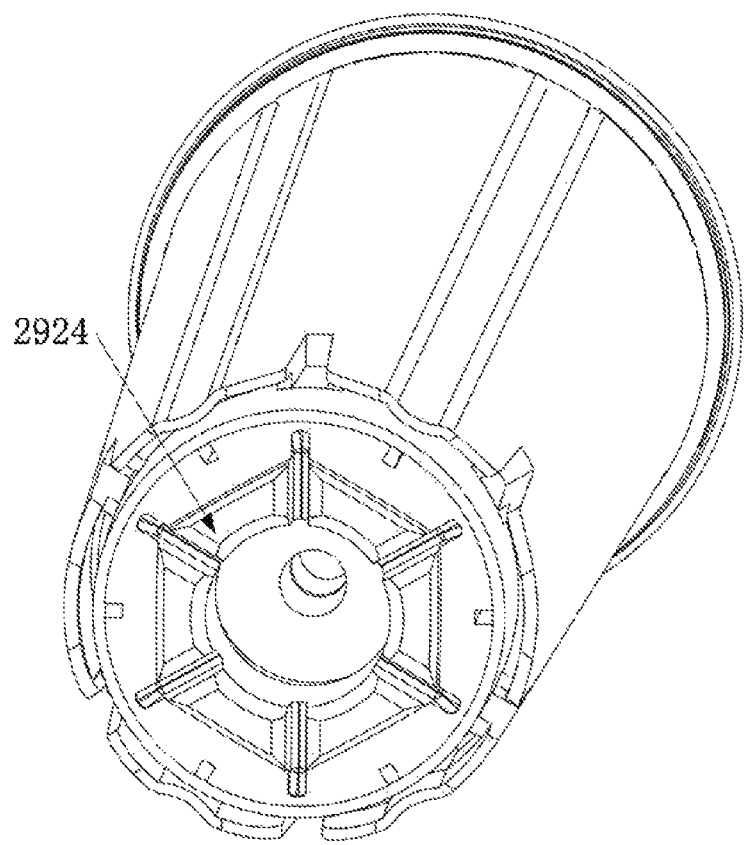
FIG. 5 is a schematic diagram of another sealing ring in accordance with the teachings of the present disclosure
Figure 6:
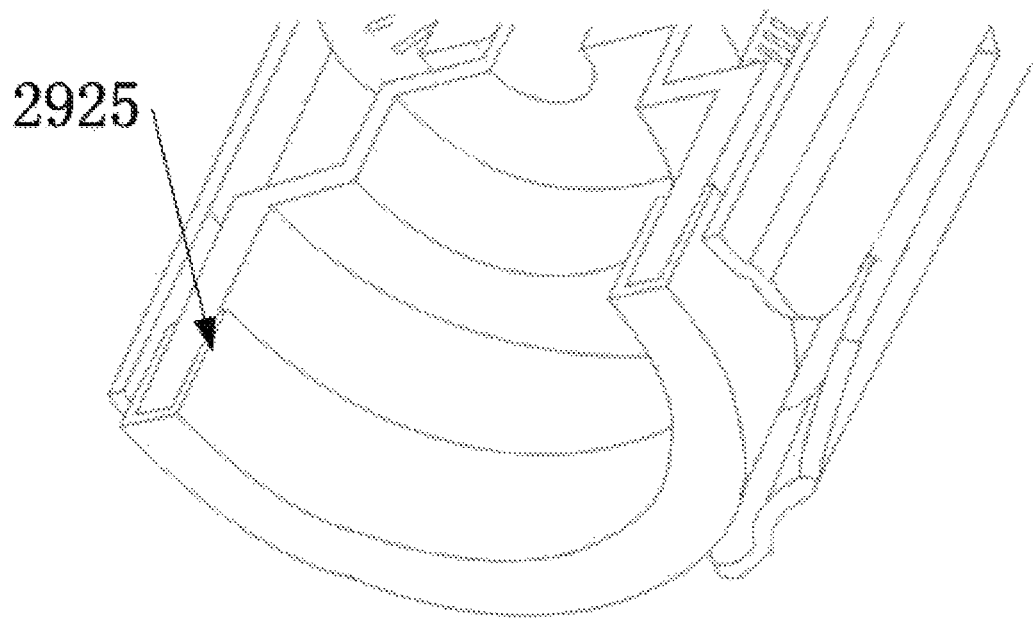
FIG. 6 is a schematic diagram of yet another sealing ring in accordance with the teachings of the present disclosure.

In order to adapt the different types of coffee machines, the present disclosure comprises at least four types of sealing ring to match with different types of coffee machines. As shown in FIG. 1, the first type of sealing ring 292 is a ring-shaped nested concave-convex type, and the sealing area is the annular concave-convex inner wall. As shown in FIG. 4, the second type of sealing ring 2923 is a nested polygonal type, and the sealing area is a polygonal inner wall. As shown in FIG. 5, the sealing areas of the third type of sealing ring 2924 are respectively the groove area between the six protrusions and the annular area of the outer part of the six protrusions. As shown in FIG. 6, the fourth type of sealing ring 2925 is a nested annular type, which sleeved on the annular protrusion, and the sealing area is the annular inner wall. No matter which structure of the sealing ring is adopted, the present disclosure has no limitation if it acts as a sealing role.

Figure 7:
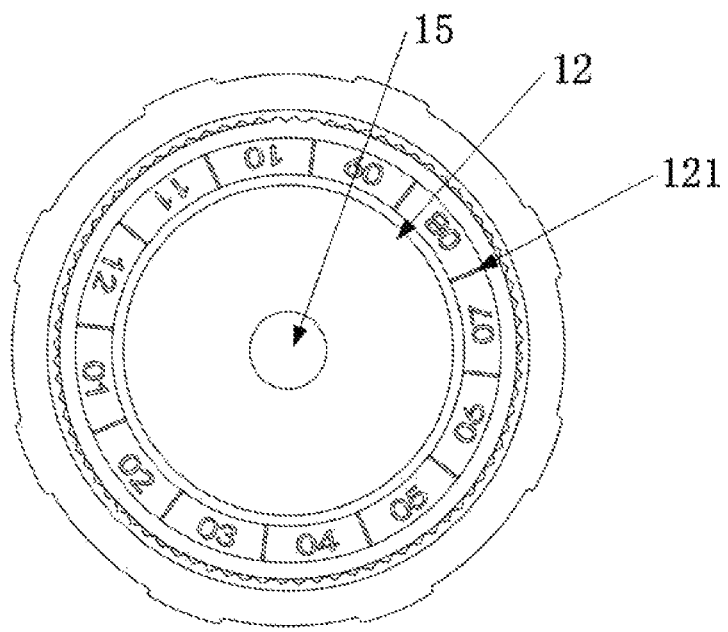
FIG. 7 is a schematic diagram of the time recording disc in the coffee machine filter cartridges in accordance with the teachings of the present disclosure.
Figure 8:
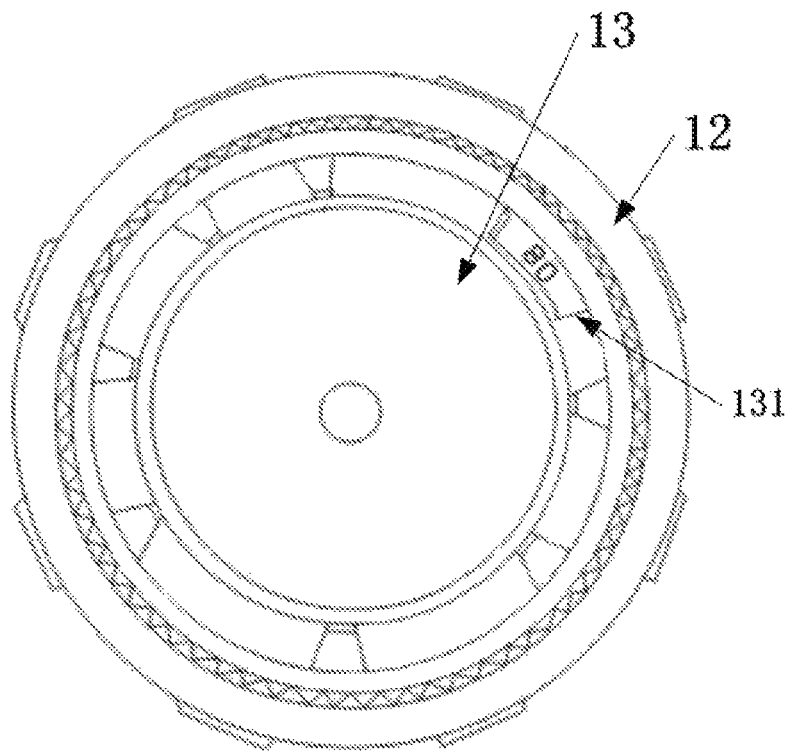
FIG. 8 is a schematic diagram of the time recording disc and pressure gland in accordance with the teachings of the present disclosure.
Figure 9:
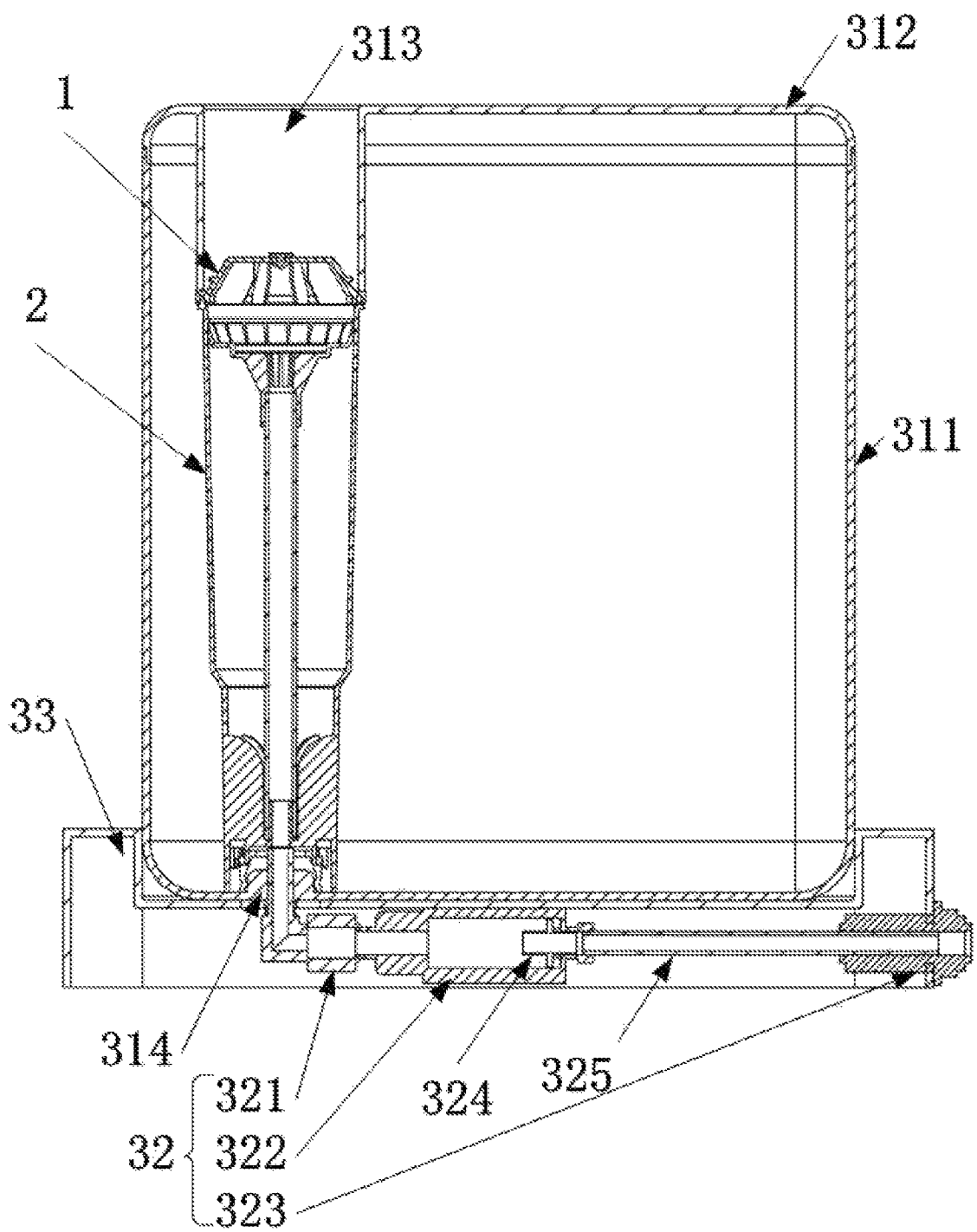
FIG. 9 is a perspective view of the coffee machine filter cartridges system in accordance with the teachings of the present disclosure.
Figure 10:
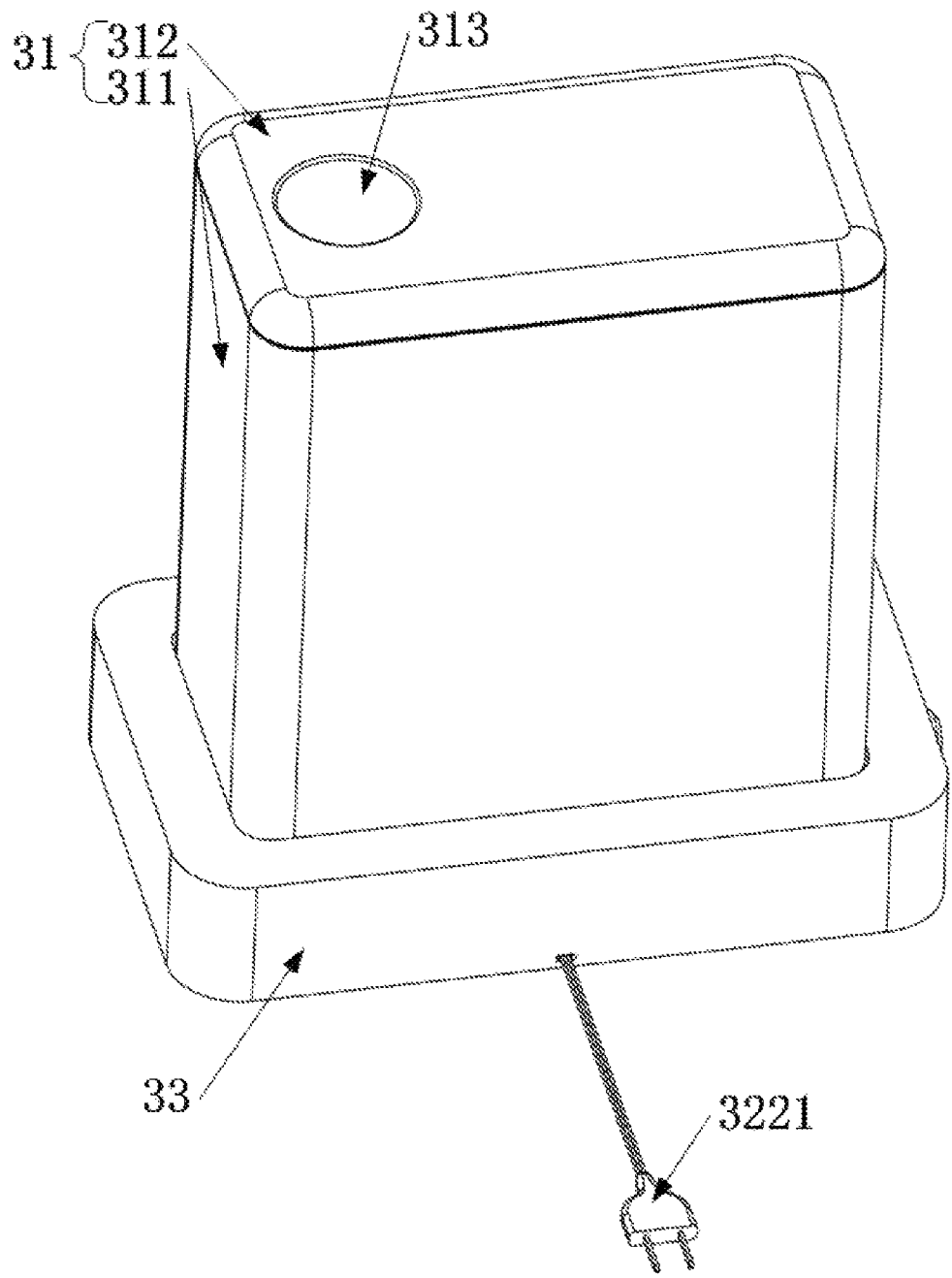
FIG. 10 is a schematic diagram of the angle state of the coffee machine filter cartridges system in accordance with the teachings of the present disclosure.
Figure 11:
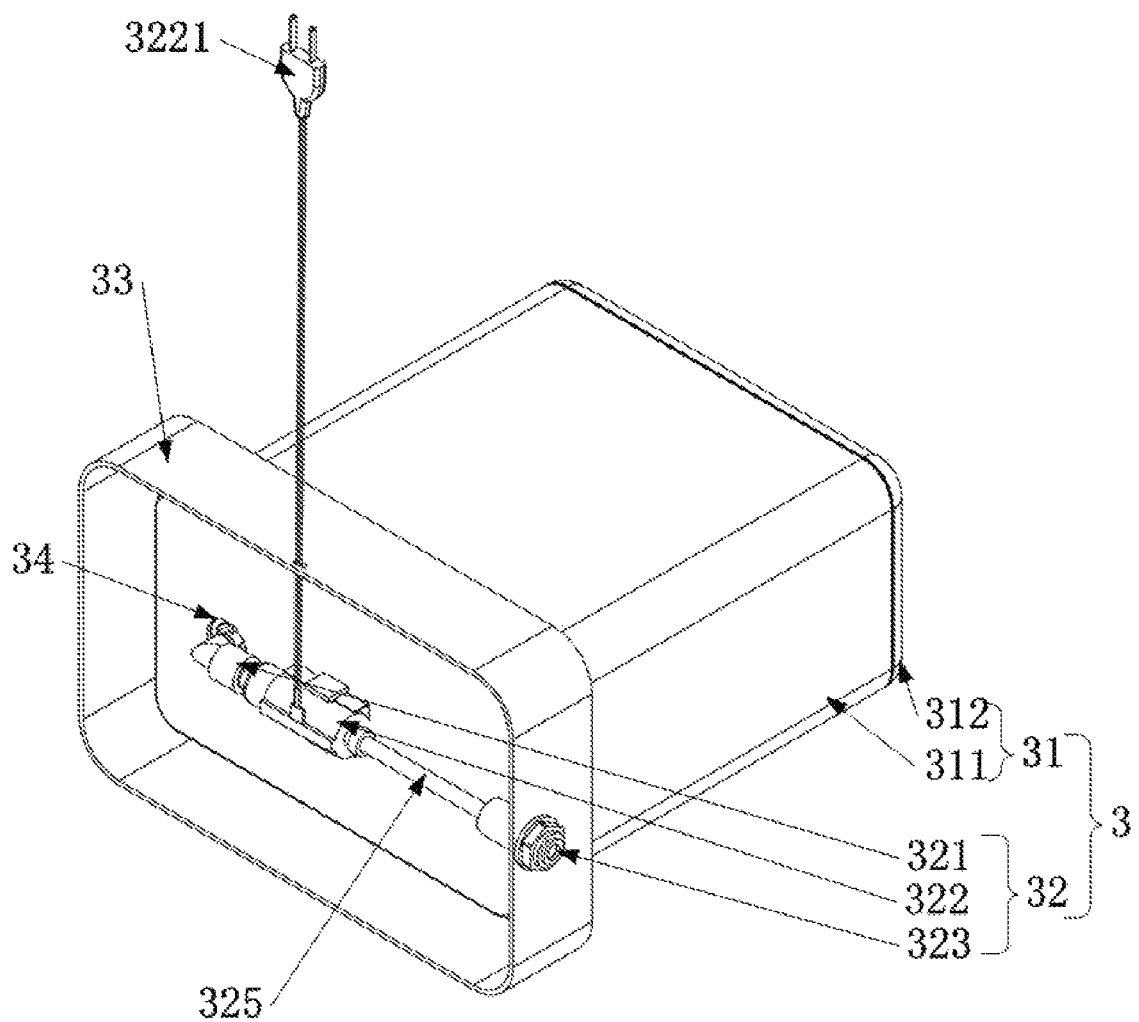
FIG. 11 is a schematic diagram of another angle state of the coffee machine filter cartridges system in accordance with the teachings of the present disclosure.

As shown in FIG. 1, FIG. 7 and FIG. 8, the lid 1 is provided with a recording disc 12 to record the descaling time of the filter cartridge. The time recording disc 12 is engraved with a plurality of time marks. The present disclosure has 12 standard scales, which represent 12 months. A pressure gland 13 is installed on the upper side of the time recording disc 12, and a notch 131 for exposing the time mark is provided on the pressure gland. A convex ridge 121 is provided between each time mark, and the convex ridge 121 is held on two ends of the notch 131. The position of the notch 131 can be adjusted by rotating the pressure gland 13 to expose the corresponding time marker.

The present disclosure records the use of the descaling function time point of the filter cartridge through the time recording disc 12. Specifically, the range of a single time mark on the time recording disc 12 is the same as the notch 131 of the pressure gland 13, the notch 131 is aligned with the corresponding time mark by rotating the pressure lid 13. Simultaneously, the convex ridge 121 on both sides of the time mark are held on two ends of the notch 131 to ensure that the pressure gland 13 will not rotate randomly during the use of the filter cartridge, which may cause inaccurate time recording.

Preferably, the time mark can be set according to a fixed format of year, month, and day, or can be set according to the plurality of times of use. When formatting the year, month and day, the time of descaling is required to record. After descaling is completed, the coffee machine can be replaced with a normal filter cartridge. In the next descaling process, adjust the time of the day. When formatting the frequency, record the frequency of using the filter cartridge. After the descaling of filter cartridge reached the frequency, the sodium citrate core is basically dissolved and the descaling is no longer function, then, a new filter cartridge can be replaced directly.

The lid 1 is further provided with a detachable sealing valve 14 and an end cap with hole 15 for placing the detachable sealing valve 14. When using it, put the filter cartridge into the water, and open the sealing valve 14. The inner part of the filter cartridge is connected to the atmosphere. Under the atmospheric pressure, the water enters into the filter chamber 25 through the water inlet 21 at the lower end of the filter cartridge, until the water level of the inner part of the filter chamber 25 is equal to outer part of the filter cartridge. Then, close the sealing valve 14 to make the filter cartridge become a sealed container. At this time, the air pressure inside the filter cartridge is lower than the external atmospheric pressure. Under the atmospheric pressure, water enters into the filter cartridge from the water inlet 21, and passes through the filter chamber 25, grate 22, filter cloth 221, and the pipe 24, and flow out from the water outlet 23 to the water path of the coffee machine. During the entire water flow process, on the one hand, the water flow is filtered to prevent the external impurities from entering into the water path of the coffee machine. On the other hand, the sodium citrate in the filter chamber 25 is fully dissolved during the water flow process, thereby achieve the descaling purpose.

The present disclosure provides a coffee machine, as shown in FIG. 1, FIG. 7, FIG. 10 and FIG. 11, comprising a heating device 3 and a coffee machine filter cartridge 100 for descaling. The heating device 3 includes a water tank 31 and a heater 32. A water tank base plate 33 is provided at the lower end of the water tank 31, the heater 32 is provided on the water tank base plate 33, and the water tank base plate 33 is provided with holes 34 for connecting the coffee machine filter cartridges 100 and the heater 32.

The heater 32 comprises an L-shaped elbow 321, a heat pump 322, and a bulkhead connector 323. One end of the L-shaped elbow 321 is connected to the water outlet 23, and the other end of the L-shaped elbow 321 is connected to one end of the heat pump 322. In connection, the other end of the heat pump 322 is provided with an impeller 324, and is connected with the bulkhead connector 323 through a pipe 325. The heat pump 322 is connected with a connecting plug 3221 for supplying power to the heat pump 322. The connecting plug 3221 penetrates the water tank base plate 33 and extends the outer side of the water tank base plate 33.

In the present disclosure, the water tank 31 comprises a water tank body 311 and a water tank lid 312. The water tank lid 312 is held on the outer step of the water tank body 311. The water tank lid 312 is provided with an viewport 313 for observing the time recording disk 12. The height of the water tank body 311 is higher than the height of the filter cartridge. There is a height difference between the bottom of the water tank 31 and the filter cartridge for the water in the water tank 31 can enter into the inner part of the filter cartridge through the water inlet 21. The inner part of the water tank 31 is provided with a sealing part 314 matching with the sealing ring. The middle part of the sealing part 314 is hollow for the water flow to pass through. The sealing ring is sleeved on the outer side of the sealing part 314. The vertical part of the L-shaped elbow 321 passes through the hollow of the sealing part 314 and is connected to the water outlet 23. The horizontal part of the L-shaped elbow is connected to the left end of the heat pump 322. An impeller 324 is provided inside the right end of the heat pump 322, and the impeller 324 is connected with the bulkhead connector 323 through a pipe 325. The presence of the heater 32, on the one hand, in the normal use of coffee machine, heating is a part of the coffee machine system. The water filtered by the water filter cartridge is heated to brew coffee. On the other hand, during descaling process, the heater 32 heats the passing water flow to make the sodium citrate is easier to dissolve to perform better descaling.

The present disclosure provides a coffee machine further comprising a filter cartridge (not labeled in FIG.). The coffee machine filter cartridges 100 or the filter cartridge is provided in the water tank 31. When descaling, the coffee machine filter cartridges 100 is used for descaling the water path of the coffee machine. For normal use, the heated water is filtered through a filter cartridge to isolate impurities in the water.

While the present disclosure has been disclosed with reference to particular details of construction, these should be understood as having been provided by way of example and not as limitations to the scope or spirit of the disclosure.

What is claimed is:

1. A filter cartridge for a coffee machine comprising:
   a filter body comprising:
      an inner wall;
      a grate comprising a cloth filter, a first end, and a second end, the second end being connected to the inner wall;
      a water outlet connected to the first end of the grate through a pipe; and
      a water inlet disposed around the water outlet;
   a filter chamber formed between the pipe and the filter body and comprising a descaling core for removing scale; and
   a lid attached to the filter body,
   wherein during a filtering and descaling process, water flows sequentially through the water inlet, the filter chamber, the grate, the pipe, and the water outlet;
   wherein the grate is funnel-shaped;
   wherein the first end of the grate comprises a first boss providing an interference fit with an upper end of the pipe fastening the grate to an inner side of the filter body; and
   wherein the second end of the grate comprises a bracket abutting a bulge on the inner wall of the filter body.

2. The filter cartridge of claim 1, wherein the bracket is disposed annularly around the grate, and the bracket comprises a plurality of V-shaped grooves spaced evening around the bracket through which water may flow.

3. The filter cartridge of claim 2, wherein the grate further comprises a second boss to place the cloth filter;
   wherein an inner wall of the second boss is connected to the cloth filter.

4. The filter cartridge of claim 3, wherein supporting elements are disposed annularly along the inner wall of the grate and configured to prevent the cloth filter from falling and deforming.

5. The filter cartridge of claim 4, wherein a first annular grid for water flow is disposed between the bracket and the second boss.

6. The filter cartridge of claim 5, wherein a lower part of the first annular grid comprises a plurality of stiffeners for supporting the first annular grid.

7. The filter cartridge of claim 1, wherein
   an upper side of the filter body comprises a convex stop,
   a lower side of the lid comprises a concave stop; and
   the convex stop matches the concave stop.

8. The filter cartridge of claim 7, wherein an inner side of the filter body comprises a bracket plate comprises the water inlet, the water inlet is a second annular grid; and the water outlet is disposed in the center of the bracket plate.

9. The filter cartridge of claim 8, wherein the water outlet is a hollow cylinder, and the pipe is sleeved on the hollow cylinder.

10. The filter cartridge of claim 9, wherein a lower part of the bracket plate comprises an annular protrusion further comprising a sealing ring.

11. A filter cartridge for a coffee machine comprising:
a filter body comprising:
an inner wall;
a grate comprising a cloth filter, a first end, and a second end, the second end being connected to the inner wall;
a water outlet connected to the first end of the grate through a pipe; and
a water inlet disposed around the water outlet;
a filter chamber formed between the pipe and the filter body and comprising a descaling core for removing scale; and
a lid attached to the filter body, wherein during a filtering and descaling process, water flows sequentially through the water inlet, the filter chamber, the grate, the pipe, and the water outlet;

wherein the lid comprises a time recording disc to record the descaling time of the filter cartridge the time recording disc comprising a plurality of time marks;

wherein the time recording disc further comprises a pressure gland on an upper side of the time recording disc;

wherein the pressure gland further comprises a notch for exposing the time mark;

wherein a convex ridge is disposed between each of the plurality of time marks, and each convex ridge is configured to be held by two ends of the notch; and wherein the lid further comprises a detachable sealing valve and an end cap comprising at least one hole-for placing the sealing valve.

12. The filter cartridge of claim 1, wherein the descaling core is a sodium citrate core.

13. The filter cartridge of claim 10, wherein the annular protrusion comprises a polygonal inner wall and the sealing ring is in a polygonal type.

* * * * *